United States Patent [19]

Pelrine et al.

[11] Patent Number: 5,284,096

[45] Date of Patent: * Feb. 8, 1994

[54] VEHICLE FOR USE IN PIPES

[75] Inventors: Ronald E. Pelrine; Eric A. Edwards, both of Menlo Park; Lawrence S. Gullman, La Honda, all of Calif.

[73] Assignee: Osaka Gas Company, Limited, Japan

[*] Notice: The portion of the term of this patent subsequent to Jun. 22, 2010 has been disclaimed.

[21] Appl. No.: 740,899

[22] Filed: Aug. 6, 1991

[51] Int. Cl.$^5$ .................. B62D 57/02; B61C 15/04
[52] U.S. Cl. .................. 104/138.2; 301/5.23; 305/7; 246/1 R; 180/901; 105/78
[58] Field of Search .............. 104/138.1, 138.2; 105/365, 78; 378/60; 15/104.05; 118/DIG. 10; 180/901, 342; 305/1, 6, 7, 19; 152/5, 1, 11; 301/5 R, 1; 446/131, 133–136, 138, 433, 445

[56] References Cited

U.S. PATENT DOCUMENTS

| | | | |
|---|---|---|---|
| 836,225 | 11/1906 | Sweeny | 301/5 R |
| 1,075,664 | 10/1913 | Miller | 305/7 |
| 1,381,597 | 6/1921 | Schifferle | 180/10 |
| 2,694,164 | 11/1954 | Geppelt | 301/5 R |
| 3,719,395 | 3/1973 | Mulasmatic | 301/5 R |
| 3,734,565 | 5/1973 | Mulasmajic | 301/5 R |
| 4,180,322 | 12/1979 | Farcinade | 246/1 R X |
| 4,369,713 | 1/1983 | Richardson | 104/138.2 |
| 4,431,075 | 2/1984 | Butka | 180/10 |
| 4,654,702 | 3/1987 | Tolino et al. | 104/138.2 X |
| 4,722,001 | 1/1988 | Röhrich et al. | 104/138.2 X |
| 4,770,105 | 9/1988 | Takagi et al. | 104/138.2 |
| 4,862,808 | 9/1989 | Hedgcoxe et al. | 105/365 X |

FOREIGN PATENT DOCUMENTS

| | | | |
|---|---|---|---|
| 268782 | 11/1987 | Japan | 180/901 |
| 0020279 | 1/1988 | Japan | 105/77 |

Primary Examiner—Robert J. Oberleitner
Assistant Examiner—Kevin D. Rutherford
Attorney, Agent, or Firm—Larson & Taylor

[57] ABSTRACT

A vehicle is provided for moving within pipes to determine the condition of the interior of the pipes. The vehicle has at least one wheel which is capable of travelling on walls of magnetic material. Each wheel comprises an outer wheel member having an annular peripheral wall with an inner wheel member including a portion of magnetically permeable material. The inner wheel member has an outside diameter smaller than the inside diameter of the outer wheel member and is rollable on the inner peripheral surface of the outer wheel member. A magnet is provided in the inner wheel member having magnetic poles in contact with the permeable portion of the inner wheel. The vehicle is capable of moving through pipes without being blocked by obstacles such as a vertical wall extending from a horizontal surface. A sensor is mounted on the vehicle and a sensor processing module receives distance and time data and processes the data to determine whether the pipe is clear or obstructed.

15 Claims, 10 Drawing Sheets

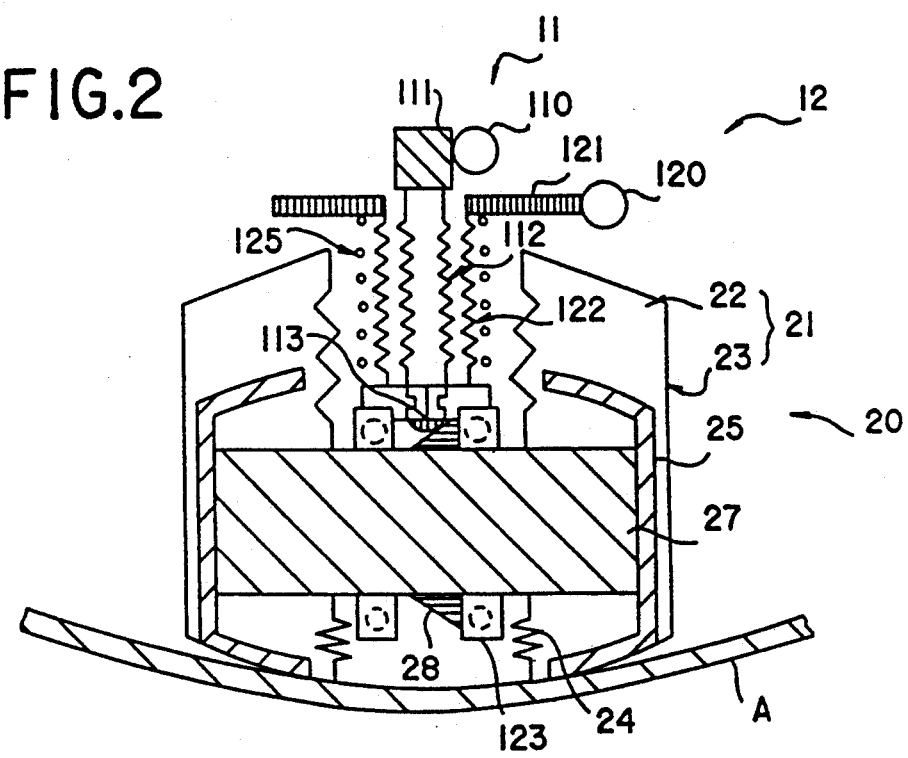

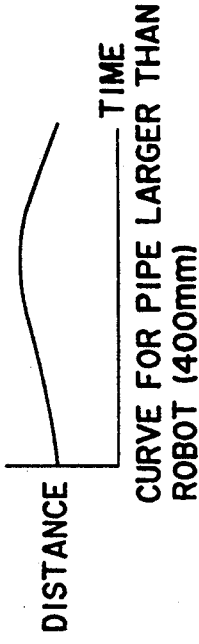
FIG.11A CURVE FOR A SMOOTH PIPE SLIGHTLY LARGER THAN ROBOT (200mm)
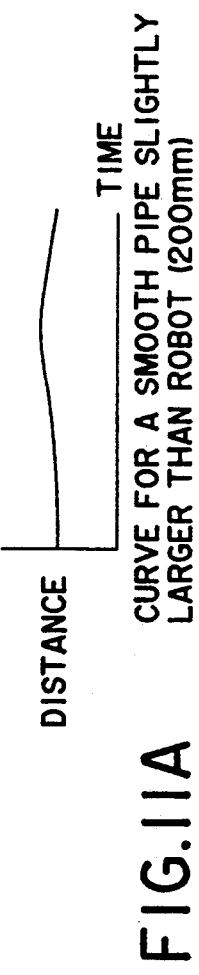
FIG.11C CURVE FOR OBSTACLE SUCH AS A PIPEWRENCH IN THE PIPE
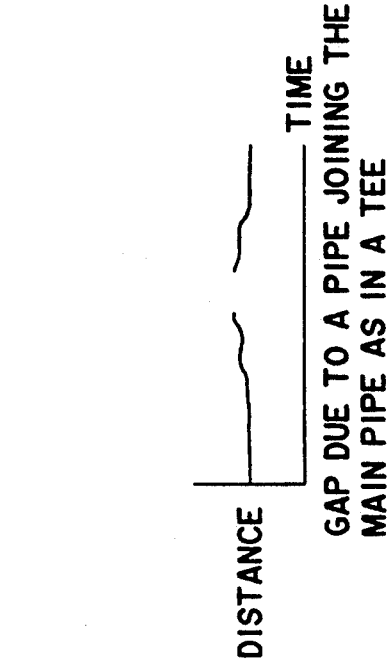
FIG.11B CURVE FOR PIPE LARGER THAN ROBOT (400mm)
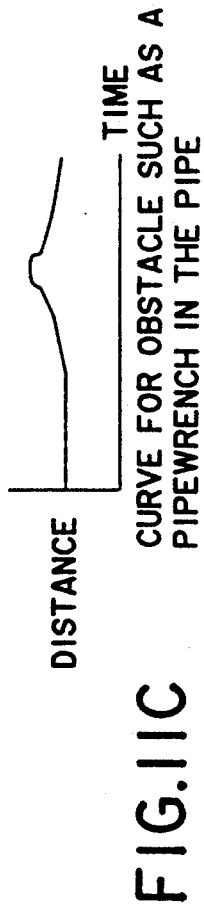
FIG.11E A GAP AND INTRUSION FROM AN ELL
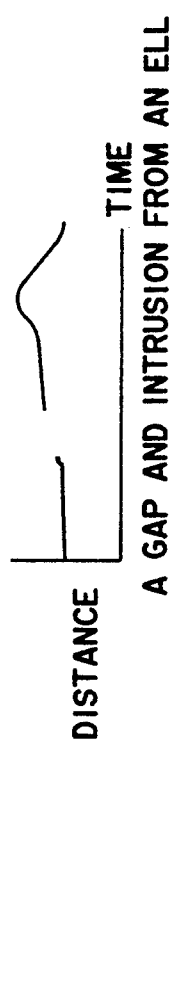
FIG.11D GAP DUE TO A PIPE JOINING THE MAIN PIPE AS IN A TEE

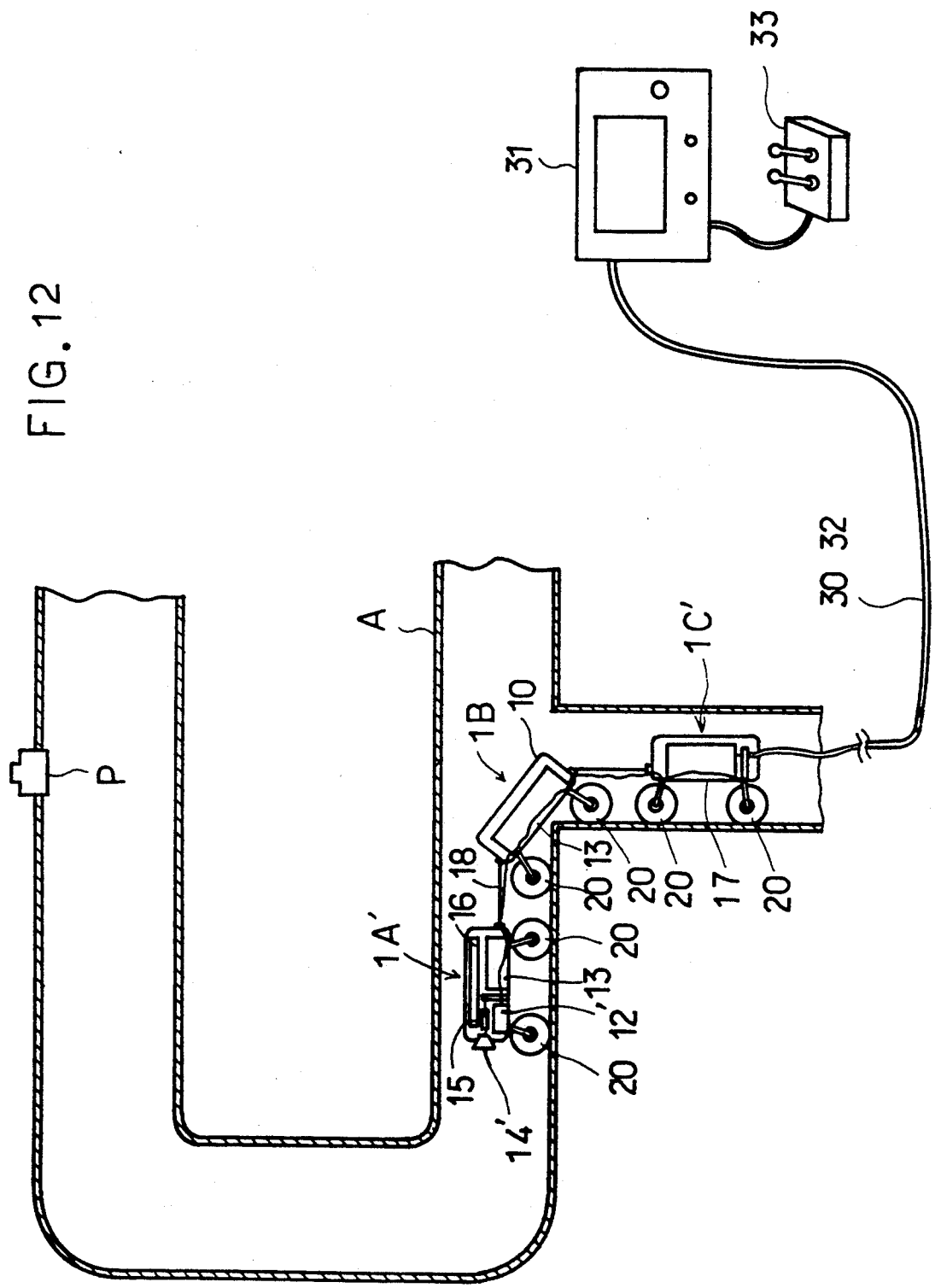

VEHICLE FOR USE IN PIPES

FIELD OF INDUSTRIAL APPLICATION

The present invention is related to U.S. application Ser. No. 744,330 filed Aug. 7, 1991.

The present invention relates to vehicles adapted to freely travel on the outside or inside of pipes with use of a magnetic force.

PRIOR ART AND PROBLEMS INVOLVED

Various vehicles of the type mentioned have been proposed which have a pair of wheels at each of the front and rear portions of the vehicle body. Each of the wheels includes a permanent magnet interposed between two or three disks of magnetically permeable material. These wheels are intended to operate on or in ferromagnetic pipes such as steels pipes. However, since the permeable disk is in direct contact with the running surface, the surfaces on which such a vehicle is capable of travelling are limited. For example in translation from horizontal wall to vertical wall, the disk becomes attracted to both the walls, failing to leave the horizontal wall and bringing the vehicle to a halt. Further because the permeable disks and the magnet are left exposed during use, the vehicle can not be free from the buildup of ferromagnetic particles of dirt or rust during travel.

SUMMARY OF THE INVENTION

An object of the present invention is to solve these problems of the prior art.

More specifically, an object of the invention is to provide a vehicle adapted to travel through pipes without being blocked by obstacles of various configurations such as a vertical wall extending from a horizontal surface.

Another object of the invention is to provide a vehicle which can be free from the buildup of ferromagnetic particles of dirt or rust during travel within pipes.

To fulfill these objects, the present invention provides a vehicle for use in pipes comprising a vehicle body, at least one wheel provided at the vehicle body, and a drive assembly for driving at least one wheel, each of the wheels comprising an outer wheel member having an annular peripheral wall, an inner wheel member including a portion of magnetically permeable material having an outside diameter smaller than the inner diameter of the outer wheel member and rollable on the inner peripheral surface of the outer wheel member, and a magnet provided in the inner wheel member and having magnetic poles in contact with the permeable portion, the drive assembly being connected to the inner wheel members of said wheel.

The invention further provides a vehicle for use in pipes comprising a vehicle body, at least one wheel provided respectively at the vehicle body, and a drive assembly for driving at least one wheel, each of the wheels comprising an outer wheel member having an annular peripheral wall, an inner wheel member including a portion of magnetically permeable material having an outside diameter smaller than the inner diameter of the outer wheel member and rollable on the inner peripheral surface of the outer wheel member, and a magnet provided in the inner wheel member and having magnetic poles in contact with the permeable portion, the drive assembly being connected to the outer wheel members of said wheel.

The invention further provides a vehicle for use in pipes comprising a vehicle body, at least one wheel provided respectively at the vehicle body, and a drive assembly for driving at least one wheel, each of the wheels comprising an outer wheel member having an annular peripheral wall, an arm rotatably mounted on the central portion of the outer wheel member and having a portion of magnetically permeable material radially extending to a position close to the inner peripheral surface of the outer wheel member, a magnet mounted on the arm with its poles in contact therewith, and an arm rotating portion for rotating the arm through a desired angle.

According to the embodiment of the invention, each of the wheels attached to the vehicle body comprises an outer wheel member having an annular peripheral wall, an inner wheel member having a portion of magnetically permeable material and a magnet provided in the inner wheel member, so that the magnetic force of the magnet acts on the running surface through the inner wheel member and through the outer wheel member. The vehicle is therefore adapted to travel reliably along vertical surfaces, ceiling, inclined surfaces and the like while being prevented from slipping or falling by the magnetic force of attraction. Especially for translation between two surfaces of different inclinations as between a horizontal wall and a vertical wall, the inner wheel member, which is rollable on the inner peripheral surface of the outer wheel member, first moves from one surface to the other by moving along on the inner peripheral surface of the outer wheel member, which is halted in contact with the two surfaces, thereby permitting the outer wheel member to move along with ease. Consequently, the vehicle is capable of travelling freely on the surface of complex obstacles in a three-dimensional space.

In the case where the outer wheel member has an annular peripheral wall and two side walls closing the respective opposite ends of the peripheral wall to enclose the inner wheel member therein, the inner wheel member can be free from magnetic dust or particles.

According to another embodiment of the invention, the wheel attached to the vehicle body comprises an outer wheel member, an arm rotatably mounted on the central portion of the outer wheel member and having a portion of magnetically permeable material radially extending to a position close to the inner peripheral surface of the outer wheel member, and a magnet mounted on the arm. The arm can therefore be freely oriented toward the running surface magnetically to hold the wheel to the running surface. This enables the vehicle to travel reliably on surfaces of any inclination. The wheel is further provided with an arm rotating portion for rotating the arm through a desired angle. When the wheel comes into contact with a stepped portion, the arm is driven through about 90 degrees and held to the stepped portion, and the outer wheel member is driven in this state, whereby the wheel is caused to climb the stepped portion.

Other objects, features and advantages of the present invention will become apparent from the following description with reference to the accompanying drawings.

BRIEF DESCRIPTION OF THE DRAWINGS

FIG. 2 is a sectional view schematically showing an example of a wheel which is usable for the vehicles shown in FIG. 1;

FIGS. 9, 10 and 11a-11e are diagrams for illustrating the principle of operation of a surface detector for use in the vehicle of the invention.

FIG. 12 is a side elevation in vertical section showing a train of vehicles of another embodiment of the invention traveling in the pipe and connected to a remote control device.

EMBODIMENTS

Figure 1:
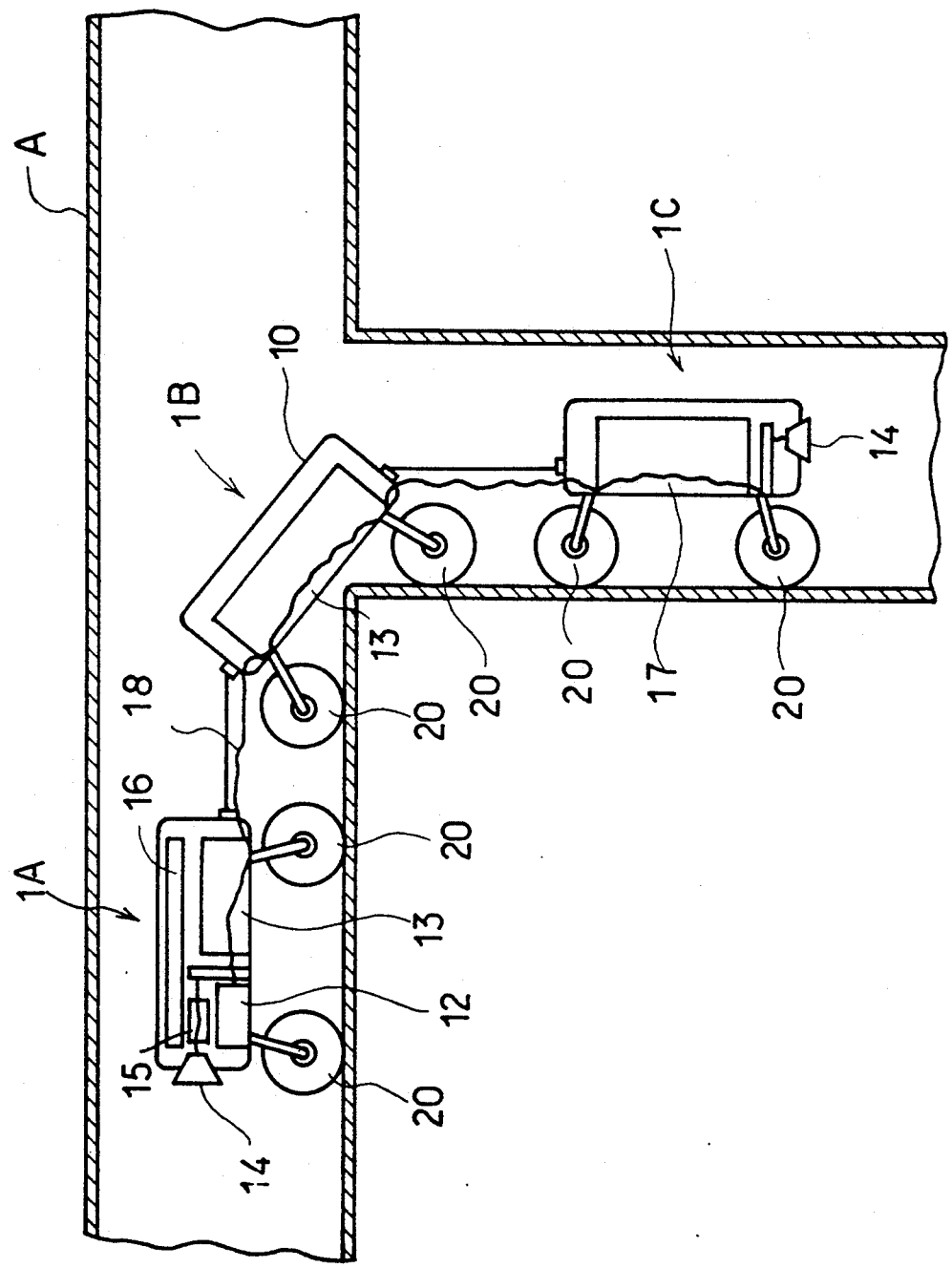
FIG. 1 is a side elevation in vertical section showing a train of vehicle embodying the invention during travel within a pipe.

FIG. 1 shows a vehicle 1A of the invention adapted to travel through pipes, and vehicles 1B and 1C connected to the vehicle 1A while the train of vehicles is traveling in a pipe A. Each of these vehicles has a body 10, and a pair of wheels 20 at each of the front and rear portions of the vehicle body 10. The vehicle 1A is further provided within its body 10 with a drive assembly 11 (shown in FIG. 2), steering assembly 12, battery unit 13, surface detector 14, device 15 for detecting the position or orientation of the vehicle and computer 16. The device 15 can comprise a gyro device and/or a tilt sensor. The connected vehicle 1B has a battery unit 13 for supplying power to the vehicle 1A. The connected vehicle 1C has mounted in its body a surface detector 14 which is usable when the train advances reversely, and is adapted to carry thereon various working devices needed, for example, for repairing or photographing the inside of the pipe. Flexible drive and steering cables 18 extend from the drive assembly 11 and the steering assembly 12 of the vehicle 1A for driving and steering the wheels 20 of these connected vehicles.

With reference to FIG. 2, each wheel 20 comprises an outer wheel member 21 having an annular peripheral wall 22 and side walls 23 covering opposite sides of the wall 22, an inner wheel member 25 of magnetically permeable material having an outside diameter smaller than the inside diameter of the outer wheel member 21 and rollable on the inner peripheral surface of the outer wheel member 21, and a magnet 27 fitted in the inner wheel member 25 with their poles in contact therewith. The peripheral wall 22 and the side walls 23 of the outer wheel member can be made of a metal, rubber, synthetic resin or composite material of such substances having rigidity capable of bearing the load of the vehicle body and the magnetic forces. The outer wheel member has a disk 24 formed on its central portion with an opening for the magnet 27 to extend therethrough and covering an opening of the wheel member 21. The disk 24 is flexible so as to shift its opening radially. It is desired that the peripheral wall 22 contain magnetic particles, which are preferably arranged into a multiplicity of columns radially of the outer wheel member, whereby the lines of magnetic force from the magnet 27 can be effectively directed toward the running surface. Alternately, outer wheel member 21 can be a metal shell. By using a metal shell the outer wheel member 21 can be made very rigid and strong. As will be clear from the later discussion of FIG. 3, a rigid outer wheel member 21 is desirable to avoid deformations of outer wheel member 21 during transitions from a horizontal wall to a vertical wall or the like. The metal shell can be coated with softer materials, such as rubber, to increase traction and to avoid damaging the surface on which outer wheel member 21 is rolling. Additionally, the peripheral wall 22 can be made of magnetic steel, iron, or other magnetically permeable material to assist in transmitting the magnetic field from inner wheel member 25 to surface A. In this particular embodiment it is desirable to make side walls 23 out of a non-magnetic metal to reduce unwanted magnetic flux leakage. The non-magnetic metal side walls 23 may be welded or otherwise attached to the magnetic metal peripheral wall 22 to form the metal shell for outer wheel member 21. The inner wheel member 25 of the present embodiment has a pair of bowl-shaped disks of soft iron spaced apart from each other. Alternatively, the inner wheel member 25 can have a pair of solid disks. Whether bowl-shaped or solid, the outer circumference of inner wheel member 25 can be shaped to match the curvature of the pipe. The inner wheel member 25 can be made of other magnetically permeable material. The magnet 27 is in the form of a bar and is fixedly provided between the pair of soft iron disks of the inner wheel member 25, with the N and S poles in contact with the disks. Although the magnet used in the present embodiment is a permanent magnet for lightness, an electromagnet is alternatively usable if the weight and power poses no substantial problem. The same is true of the other embodiments to be described below. An annular bevel gear 28 is fixedly mounted around the central portion of the magnet 27 and coupled to the drive assembly 11 and the steering assembly 12. FIG. 2 partly shows the drive assembly 11 and the steering assembly 12. The drive assembly 11 comprises a flexible drive shaft 110, a gear 111 supported by the vehicle body and rotatable by the drive shaft, drive bellows 112 connected at one end thereof to the gear, and a bevel gear 113 connected to the other end of the bellows and meshing with the bevel gear 28 on the magnet 27. The steering assembly 12 comprises a flexible steering shaft 120, a gear 121 supported by the vehicle body and rotatably by the steering shaft, steering bellows 122 connected at one end thereof to the gear, and a pair of bearings 123 connected to the other end of the steering bellows and rotatably supporting the magnet 27 inside. The steering gear 121 and the steering bellows 122 have a central hollow portion for the drive bellows 112 to extend therethrough coaxially. The pair of bearings 123 are disposed on the respective opposite sides of the bevel gears 113 and 28. Disposed between the gear 121 and the pair of bearings 123 is a coiled compression spring 125 surrounding the steering bellows 122 for supporting the load of the vehicle body. In the wheel 20, the rotation of the drive shaft 110 is transmitted to the gear 28 to rotate the magnet 27 and the inner wheel member 25. The rotation of the wheel member 25 rotates the outer wheel member 21 to advance the vehicle body. Rotation of the outer wheel member 21 tends to sweep unwanted magnetic debris, such as rust particles, away from the magnetic field of the inner wheel member 25. Once away from the strong magnetic field, the debris will fall or can be easily brushed off. Further, the rotation of the steering shaft 120 is transmitted to the magnet 27 via the bearings 123, rotating the magnet 27, inner wheel member 25 and outer wheel member 21 about an axis perpendicular to the running surface for steering. The drive bellows 112 and the steering bellows 122 are metal bellows, which are free to stretch or contract axially thereof to absorb irregularities in the running surface but are rigid in the direction around the axis for the transmission of torque. These bellows can be replaced by various means which are so constructed as to produce the same effect. For example, the drive shaft can be provided with a universal joint and a telescopic expansion joint at an intermediate portion thereof.

Figure 3A:
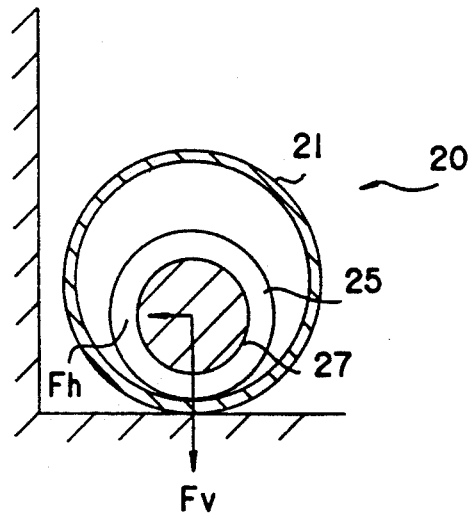
FIGS. 3a-3e include diagrams for illustrating the wheel of FIG. 2 in a running state.
Figure 3C:
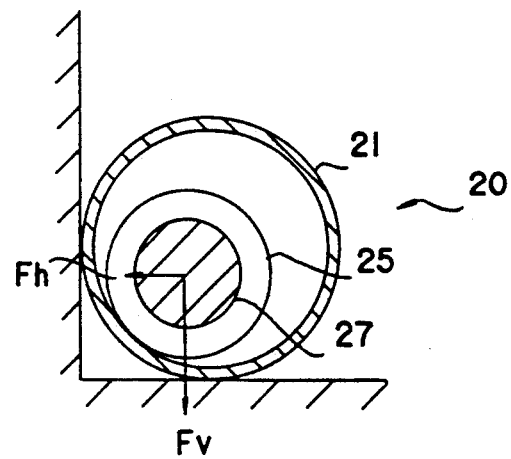
Figure 3E:
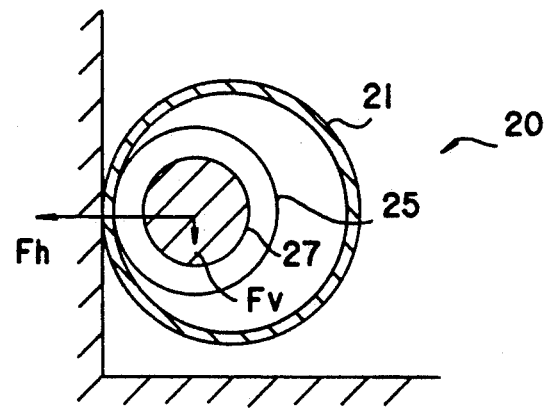
Figure 3B:
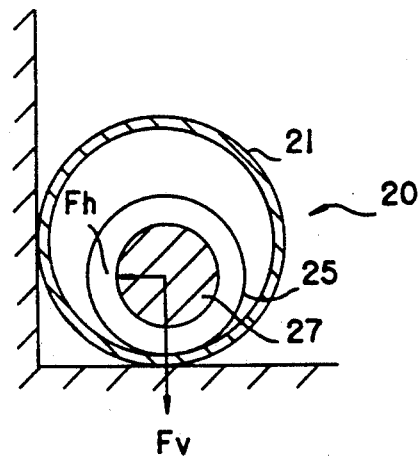
Figure 3D:
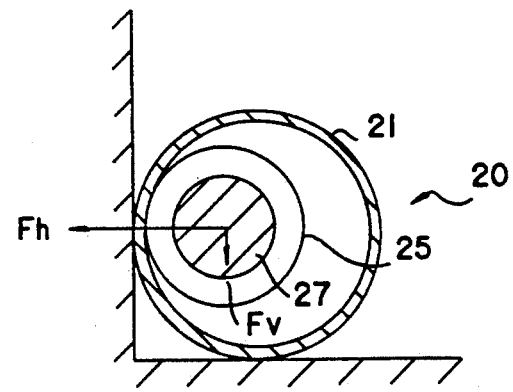

The vehicle thus constructed travels in the following manner, for example, for translation from horizontal wall to vertical wall. FIG. 3 shows one of the wheels 20 of the vehicle during travel. First as seen in FIG. 3(a), the wheel 20 moves along from right to left in the drawing while rolling on the horizontal wall. In the wheel 20, the inner wheel member 25 is driven to roll along inside the outer wheel member 21 to thereby advance the outer wheel member 21. Upon coming into contact with the vertical wall as shown in FIG. 3(b), the outer wheel member 21 is used to advance horizontally, permitting the inner wheel member 25 to ascend the inner peripheral surface of the outer wheel member (see FIG. 3(c)). When the inner wheel member 25 continues its rotation after ascending the inner peripheral surface of the outer wheel member 21 to the position shown in FIG. 3(d), the outer wheel member 21 starts to advance upward along the vertical wall (see FIG. 3(e)). In translation from vertical wall to horizontal wall as shown in FIG. 1 or in ascending or descending a curved surface, the inner wheel member 25 moves along such a running surface, allowing the outer wheel member 21 to move along together with the member 25. In this way, the wheel 20 is capable of traveling along walls in a three-dimensional space freely.

Next, the diameter ratio between the outer wheel member 21 and the inner wheel member 25 of the wheel 20 will be described. For the transition from the state of FIG. 3(b) to the state of FIG. 3(c), the inner wheel member 25 needs to ascend the inner surface of the outer wheel member from the position most proximate to the horizontal wall, i.e., from the lowermost portion of the inner surface of the outer wheel member, against a magnetic force Fv acting toward the horizontal wall. In this case, the greater the difference in diameter between the outer wheel member 21 and the inner wheel member 25, the smaller is the height the inner wheel member 25 ascends per revolution thereof and therefore the smaller is the force needed for the member 25 to ascend the inner surface. However, when the diameter difference between the two wheel members is excessively large, the magnetic force Fh acting on the vertical wall is likely to be insufficient in an intermediate state like the state shown in FIG. 3(c). Especially, if the magnetic force is insufficient in translation from vertical wall to ceiling or like horizontal wall, the vehicle is likely to fall. On the other hand, if the two wheel members are closer in diameter, the greater is the force required of the inner wheel member for ascending the inner surface of the outer wheel member, but greater is the magnetic force available in the intermediate state. Accordingly, the diameter ratio between the outer wheel member and the inner wheel member must be so determined as to meet both the requirements in respect of the ease with which the inner wheel member moves along the outer wheel member's inner surface against the magnetic force Fv and the magnitude of force holding the wheel to the running surface. It is desired that the difference between the inner and outer wheel members be as great as possible insofar as a sufficient holding force is available. In determining the diameter difference, consideration is given to the coefficient of friction between the two wheel members, mode of translation between running surface portions, weight of the inner wheel member including the magnet, weight of the vehicle, etc.

The vehicle 1A shown in FIG. 1 is equipped with the surface detector 14, device 15 and computer 16 to be described below.

The surface detector 14 comprises a projector for emitting light forwardly of the vehicle, a position sensor for detecting the position of a reflecting surface from the light emitted by the projector and reflected from the surface to produce a surface position signal, and means for rotating the projector and the position sensor about an axis in parallel to the direction of advance of the vehicle body. Preferably the projector is a semiconductor laser for projecting a beam. The position sensor can be a semiconductor position sensor or like known device capable of detecting the position of reflecting surfaces from the reflected light. The rotating means rotates the projector and the position sensor about the above-mentioned axis to thereby scan the inner surface of the contemplated pipe with the light from the projector and obtain surface position signals for the entire inner surface.

Figure 9:
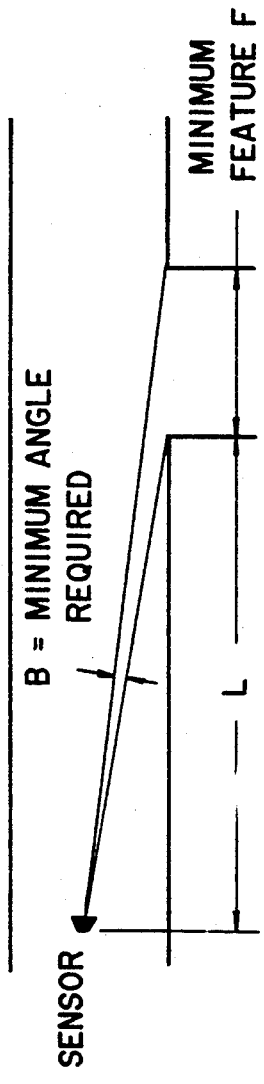

An important quality of the sensor is its angular resolution. When the vehicles approach an opening in the pipe wall, such as a tee joint, the sensor will see only a small gap in the pipe wall. The size of this gap depends on how far the vehicle is from the opening. In FIG. 9, the required angular resolution is shown. If the minimum feature, F, to be measured is 5 mm at a distance, L, of 200 mm, about 0.5 degree resolution, B, is required.

Figure 10:
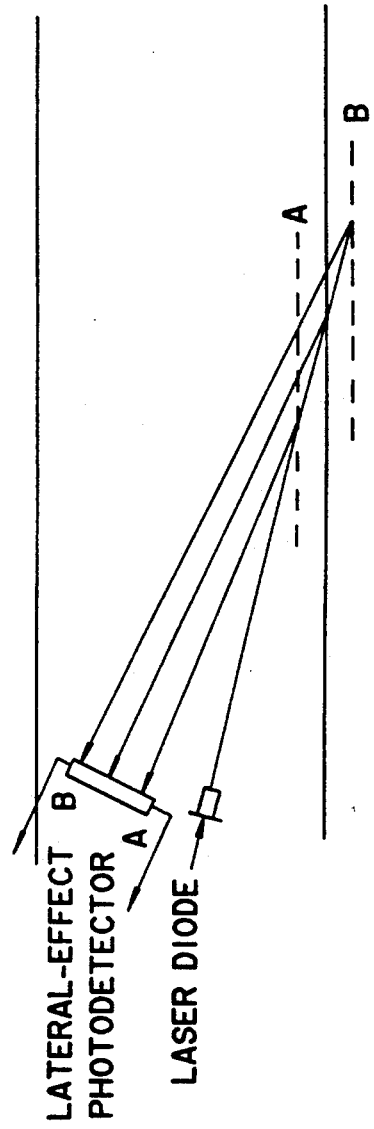

The sensor scans the pipe wall ahead of the vehicles. By moving the laser and photodetector together, the sensor is made to scan a circle, preferably concentric with the circumference of the pipe. Alternatively, the scanning could be accomplished by moving the focusing optics with the laser and sensor stationary. If anything intruded in the pipe space (A in FIG. 10) it would show up as an unusually close distance on the sensor. Also any openings in the pipe (B) would be seen as a longer or infinite distance. The sensor processing module receives these distance-versus-time (the time represents the angular position of the sensor) data and processes them to determine whether the pipe is clear, whether there is an obstacle in the pipe, or whether a junction has been reached (and if so, what type of junction).

When the pipe is clear, the plot of distance vs. time for a pipe slightly larger than the vehicle's cross section will be more or less a constant, as shown in FIG. 11(a). When the vehicle's cross-section is much less than the pipe, we get a curve, FIG. 11(b), in which the distance is more or less constant for the portion of the pipe closest to the vehicles then rises smoothly and drops back smoothly to the constant value. An obstacle in the pipe, such as a wrench, results in a distance discontinuity in the normal distance curve, followed by a short constant value, followed by a discontinuity back to the normal distance curve, as in FIG. 11(c). A pipe junction results in a loss of data for a period of time because the return is lost while the beam falls into the branch pipe, resulting in a break in the distance-vs.-time curve, as in FIG. 1(d). An ell junction, unlike a tee, results in a loss of signal on one side of the pipe with a increased signal on the opposite side, as in FIG. 11(e).

Besides the surface detector 14 utilizing light as described above, also usable are those utilizing various means such as ultrasonic waves or microwaves.

As the device 15 various kinds of gyros and/or tilt sensors can be used. The gyro can be one of various known types such as ring laser gyro, turned dry gyro, single-degree-of-freedom floated rate integrating gyro and the like. The tilt sensor can be one or more of the various known types such as the pendulum potentiometer, magnetoresistive tilt sensor, and the like. The device 15 detects the position of the vehicle within pipes to produce a vehicle orientation signal. The computer 16 detects the position of the vehicle and the configuration of surfaces such as bent inner surfaces of pipes and obstacles ahead of the vehicle from the vehicle position signal and the surface position signal from the surface detector 14. The computer 16 then feeds signals for controlling the direction of travel and speed for the travel of the vehicle based on the result to the drive assembly 11, which in turn controls the speed and steering based on the signals. In the case where changes in the surface configurations inside pipes are limited to specific patterns, it is possible to store the patterns of surface configurations which can be present within pipes and to identify a particular surface configuration from the corresponding pattern selected from among the stored patterns with reference to the surface configuration data provided by the surface position signal. Surface configurations can then be identified with greater ease more promptly with use of a simplified device. It is further possible for the computer 16 to store a piping map prepared in advance and for the vehicle to determine its course from the vehicle position signal and surface position signal with reference to the stored map.

Figure 4:
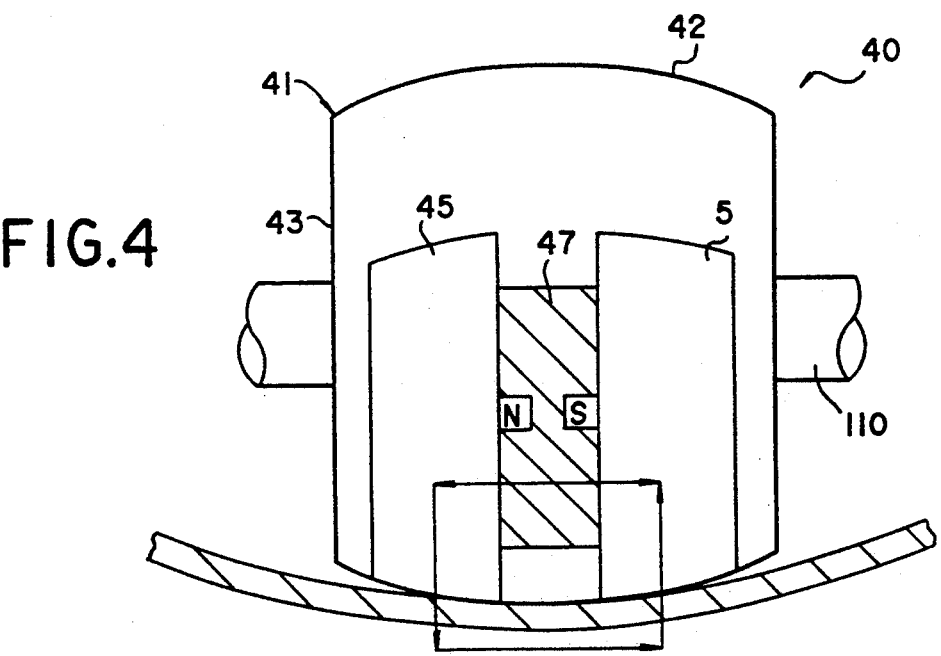
FIG. 4 is a sectional view schematically showing another example of vehicle which is usable for the vehicles of FIG. 1.
Figure 5B:
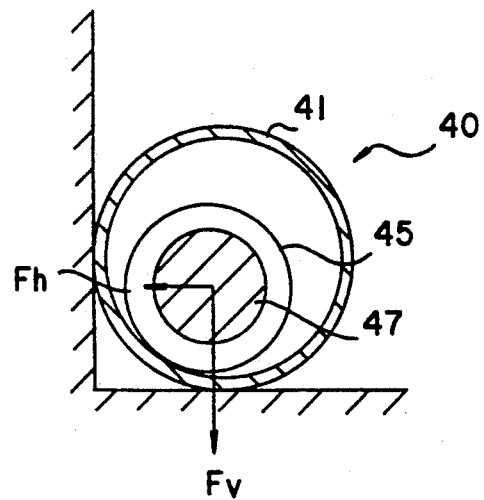
FIGS. 5a-5e and FIGS. 6a-6b are diagrams for illustrating the wheel of FIG. 4 in a running state.
Figure 5D:
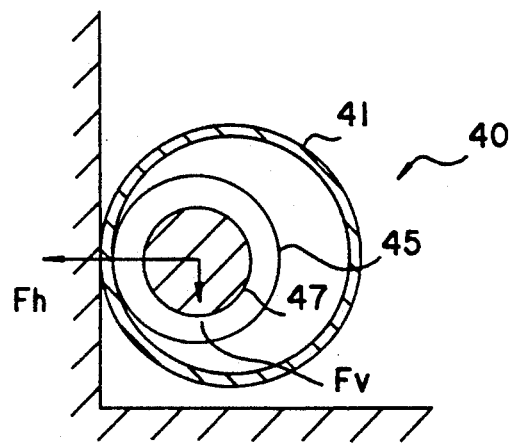

FIG. 4 shows another example of a wheel useful for the vehicle shown in FIG. 1. The illustrated wheel 40 comprises an outer wheel member 41 having an annular peripheral wall 42 and side walls 43 covering opposite sides of the wall 42, an inner wheel member 45 of magnetically permeable material having an outside diameter smaller than the inside diameter of the outer wheel member 41 and rollable on the inner peripheral surface of the outer wheel member 41, and a magnet 47 fitted in the inner wheel member 45 with their poles in contact therewith. The drive shaft 110 of a drive assembly 11 is connected to the inner side wall 43 of the outer wheel member 41. The peripheral wall 42 and the side walls 43 of the outer wheel member can be made of a metal (which is preferably nonmagnetic), rubber, synthetic resin or composite material of such substances having rigidity capable of bearing the load of the vehicle body. The inner wheel member 45 of the present embodiment has a pair of soft iron disks which are spaced apart from each other. The inner wheel member 45 can be made of other magnetically permeable material. The magnet 47 is fixedly provided between the pair of soft iron disks, with the N and S poles in contact with the respective disks.

FIG. 5 shows the wheel 40 thus constructed as it moves along from horizontal wall onto vertical wall. With reference to FIG. 5(a), the wheel 40 has its outer wheel member 41 driven to move along from right to left in the drawing while rolling on the horizontal wall. Although the inner wheel member 45, as positioned close to the horizontal wall, is subjected to a large force Fv acting toward the horizontal wall, a force Fh acting toward the vertical wall occurs when the wheel member approaches the vertical wall. Subsequently, the outer wheel member 41 comes into contact with the vertical wall. The inner wheel member 45 is still positioned closer to the horizontal wall by a distance corresponding to its weight and the greater force of attraction to the closer horizontal wall as shown in FIG. 5(b), and the force Fh acting toward the vertical wall is smaller than the force Fv acting toward the horizontal wall. In this state, the drive force of the vehicle is applied to the wheel 40, which in turn moves away from the horizontal wall in the following manner. Suppose the front wheel (wheel 40 illustrated) of the vehicle, which is drivable by both the front and rear wheels, is in contact with the vertical wall. The drive force of the rear wheel acts to advance the vehicle body forward, strongly pressing the front wheel against the vertical wall. Under this action, the front wheel when rotated by a drive force moves away from the horizontal wall. Alternatively if the illustrated wheel 40 is the rear wheel, this wheel moves away from the horizontal wall by the traction of the front wheel already ascending the vertical wall. When the outer wheel member is in contact with the vertical wall in any case, the inner wheel member 45 has been moved slightly toward the vertical wall with a larger distance from the horizontal wall than previuosly. Consequently, the force Fv acting toward the horizontal wall is smaller than previuosly, such that the force required for moving the outer wheel member from the horizontal wall can be correspondingly smaller. With increasing amount of ascent of the outer wheel member after leaving the horizontal wall, the force Fv acting toward the horizontal wall decreases. The force Fv toward the horizontal wall then becomes equal to the force Fh toward the vertical wall as shown in FIG. 5 (c). When the amount of ascent further increases thereafter, the force Fv toward the horizontal wall becomes smaller than the force Fh toward the vertical wall. This slightly moves the inner wheel member 45 further toward the vertical wall as seen in FIG. 5(d) with a further increase in the force Fh toward the vertical wall. In this way, the inner wheel member moves toward the vertical wall with an increase in the force Fh as the amount of ascent increases, with the result that the inner wheel member 45 is brought to the position most proximate to the vertical wall by being pulled by the force Fh as shown in FIG. 5(e). Consequently, a large holding force Fh acts on the vertical wall, permitting the vehicle to ascend the vertical wall reliably. In translation from vertical wall to horizontal wall as shown in FIG. 1 or in ascending or descending a curved surface, the travel of the outer wheel member 43 along such a running surface allows the inner wheel member 45 to move along together with the member 43. Thus, the wheel 40 is capable of traveling along walls in a three-dimensional space freely.

Figure 6A:
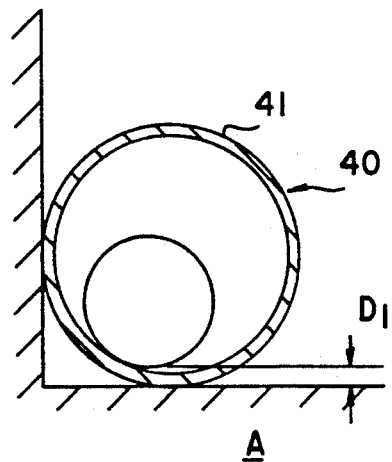
Figure 6B:
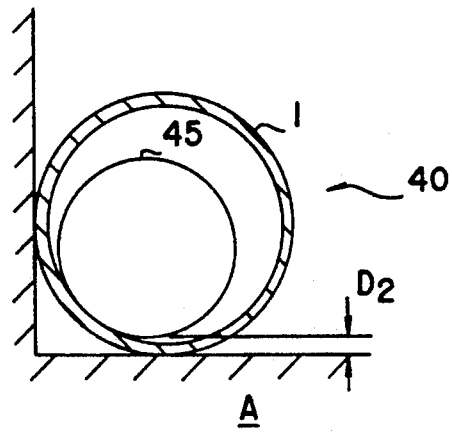
Figure 5A:
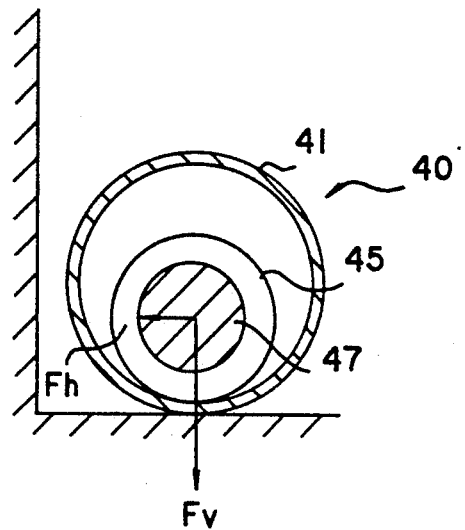
Figure 5C:
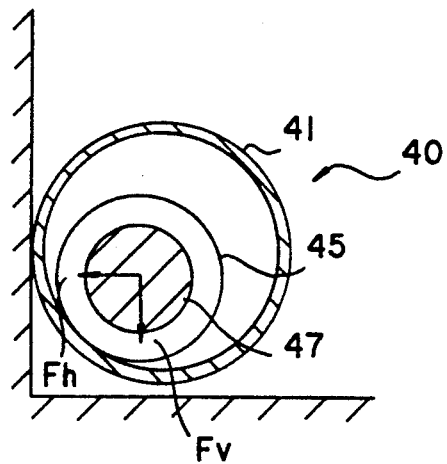
Figure 5E:
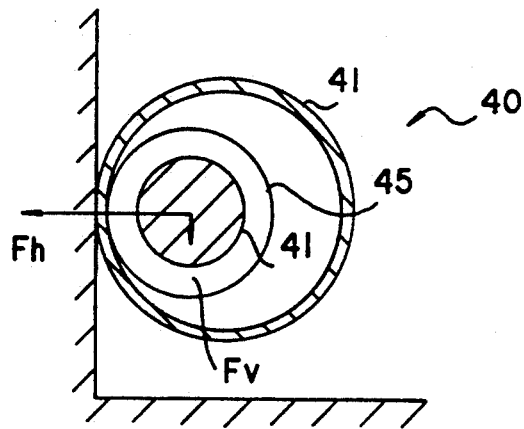

Next, the diameter ratio between the outer wheel member 43 and the inner wheel member 45 will be described FIG. 6(a) shows the case wherein the difference between the diameters of the outer and inner wheel members 42 and 45 is great, and FIG. 6(b) shows the case where the difference is small. FIG. 6(a) and (b) both show the outer wheel member in contact with a vertical wall after traveling along a horizontal wall. As already described with reference to FIG. 5, the inner wheel member 45 is positioned closer to the horizontal wall by a distance corresponding to the weight thereof and the greater force of attraction to the horizontal wall than the position where the inner wheel member is at equal distances from the two walls. If the difference in diameter between the outer and inner wheel members 42 and 45 is excessively great, during the transition from one wall to the other the inner wheel member 45 will be positioned away from both the horizontal and vertical walls in an intermediate state as shown in FIG. 6(a). The forces toward the horizontal wall and the vertical wall are then small, failing to hold the vehicle to the running surface properly. Especially, if the holding force is insufficient in translation from ceiling or like horizontal wall to vertical wall, the vehicle is likely to fall. These forces act basically similarly also in translation from vertical wall to horizontal wall and in translation between walls which are different in inclination, although gravity will act in a different mode. Conversely, a larger outer wheel diameter will help remove magnetic debris by carrying it further away from the magnetic inner wheels. FIG. 6(b) shows that when the inner and outer wheel members are closer in diameter then the inner wheel member 45 will stay closer to the wall, as can be seen in FIG. 6. Accordingly, the diameter ratio between the outer wheel member and the inner wheel member must be so determined as to meet both the requirements in respect of the ease with which the outer wheel member removes magnetic particulate matter and the magnitude of holding force on the running surface. It is desired that the difference between the two wheel members be as great as possible insofar as a sufficient holding force is available. In determining the diameter difference, consideration is given to the coefficient of friction between the wheel and the running surface, mode of translation between running surface portions, weight of the inner wheel member including the magnet, weight of the vehicle body, etc.

Figure 7A:
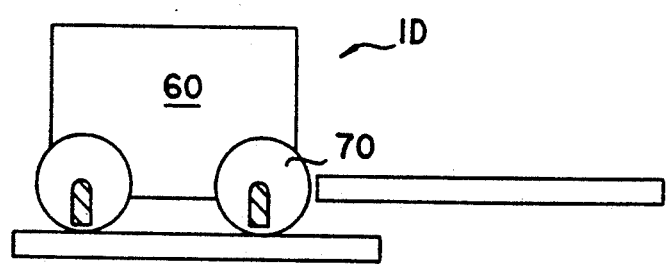
FIGS. 7a-7c include diagrams showing another vehicle embodying the invention to illustrate how the vehicle advances.
Figure 7B:
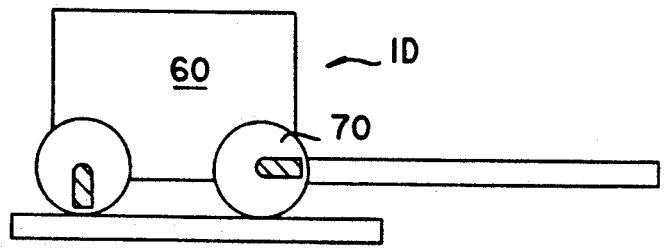
Figure 7C:
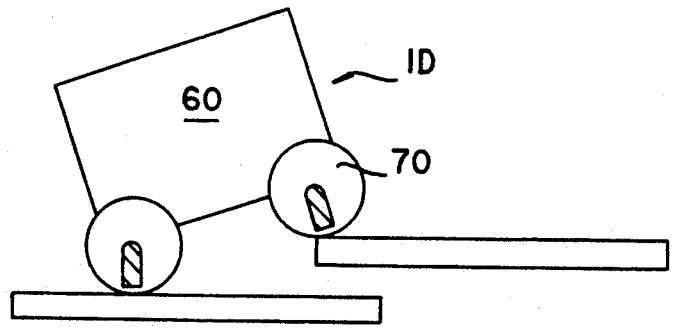
Figure 8:
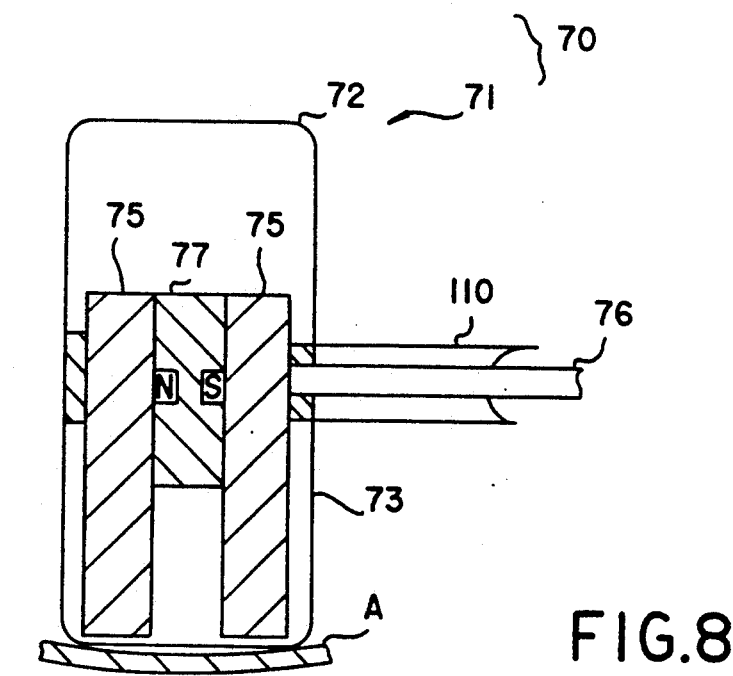
FIG. 8 is a sectional view showing the wheel of the vehicle of FIG. 7.

FIG. 7 shows another embodiment of vehicle and the state thereof during travel. The vehicle 1D has a body 60 and a pair of wheels 70 provided at each of its front and rear portions. The vehicle body 60 has the same construction as the vehicle body 10 shown in FIG. 1 and is further provided with the arm drive assembly to be described below. The vehicle body 60 can be shaped variously like the vehicles 1B and 1C in FIG. 1 and can be connected to another one. With reference to FIG. 8, the wheel 70 comprises an outer wheel member 71 having an annular peripheral wall 72 and side walls 73 covering the respective sides of the wall, an arm 75 made of a magnetically permeable material, rotatably mounted on the central portion of the outer wheel member 71 and extending almost to the inner periphery of the outer wheel member 71, and a magnet 77 mounted on the arm. The peripheral wall 72 and the side walls 73 of the outer wheel member can be made of a metal (which is preferably nonmagnetic), rubber, synthetic resin or composite material of such substances which has rigidity capable of bearing the load of the vehicle body. The drive assembly 11 has a drive shaft 110 connected to the inner side wall 73 of the outer wheel member 71. The drive shaft 110 is in the form of a tube having an arm rotating shaft 76 extending therethrough for rotating the arm 75 through a desired angle. The arm rotating shaft 76 is connected to the arm drive assembly of the vehicle body 60. The arm 75 of the present embodiment has a pair of soft iron rods which are spaced apart from each other. Other magnetically permeable material is usable for the arm 75. The magnet 77 is fixedly provided between the pair of soft iron rods of the arm 75 with its N and S poles in contact with the respective rods.

The vehicle 1D operates in the following manner. For travel on a flat or continuously curved surface, the arm 75 is so supported as to freely rotate about its shaft axis. This causes a magnetic force acting between the arm 75 and the running surface to orient the outer end of the arm toward the running surface to produce magnetic attraction between the surface and the arm 75. Accordingly, even if the running surface is vertical, horizontal like a ceiling surface, or inclined, the attraction prevents the vehicle body from sliding or falling. When the running surface has a stepped portion, the outer wheel member 71 comes into contact with the stepped portion to stop the vehicle body as seen in FIG. 7 (a). In this case, the arm rotating shaft 76 is rotated forward through about 90 degrees by the arm drive assembly 19 (see FIG. 7(b)), whereby the outer end of the arm 75 is oriented toward the stepped portion to produce magnetic attraction between the arm and the stepped portion. When driven in this state, the outer wheel member 71 rotates in contact with the stepped portion, causing the vehicle body 60 to climb the stepped portion as seen in FIG. 7(c). Although FIG. 7 shows the front wheel in contact with the stepped portion, the rear wheel also behaves similarly. A forward drive force, when continuously acting on the wheel which is out of contact with the stepped portion, permits the vehicle to climb the stepped portion with greater ease. In such a case, it is desirable to release the arm from the arm rotating shaft after the outer wheel member has rotated through an angle (for example, of 15 to 20 degrees) to render the arm free to rotate.

Although a clearance is provided between the arm outer end and the outer wheel member according to the embodiment of FIG. 7, a roller may be mounted on the arm end for rolling contact with the outer wheel member.

FIG. 12 shows another embodiment of the vehicles according to the invention. Vehicles 1A′, 1B′ and 1C′ forming a train are each basically similar in construction to the vehicles 1A, 1B and 1C shown in FIG. 1, respectively. Similar members illustrated in FIG. 12 are indicated by like numerals appearing in FIG. 1. A surface detector 14′ has a televising camera and lighting means for illuminating the surface of the surrounding objects and obstacles, if present, ahead of the train. The images are transmitted through a cable 30 to a monitor 31. Alternately, images and control signals may be transmitted using microwaves, acoustic waves, and the like. A steering assembly 12′ in the vehicle 1A drives and steers the vehicle 1A′ and, through flexible drive and steering cables 18, the vehicles 1B′ and 1C′. The steering assembly 12′ is connected to a remote control device 33 by a cable 32. The operator can see the objects and an obstacle, if present, through a television which transmits the details of objects including their shape, orientation and relative distance. Using the remote control device 33, the operator can operate the vehicles in such a way that the vehicles can advance in a desired direction at a junction or can go around an obstacle such as a plug P in FIG. 12.

The present invention is not limited to the foregoing embodiments but can be modified variously without departing from the scope of the invention as defined in the appended claims.

We claim:

1. A vehicle adapted to freely travel three-dimensionally on a running surface and comprising a vehicle body, and at least one wheel on the vehicle body, the wheel comprising an outer wheel member having an annular peripheral wall and having a rigidity capable of bearing the load of the vehicle and magnetic forces applied to the wheel, an inner wheel member including a portion of magnetically permeable material having an outside diameter smaller than the inside diameter of the other wheel member and rollable on the inner peripheral surface of the outer wheel member, a magnet provided in the inner wheel member and having magnetic poles in contact with the permeable portion, a drive assembly for driving said at least one wheel, the drive assembly being connected to the inner wheel member of said wheel, so that when the vehicle travels from a first surface portion to a second surface portion at an angle inclined relative to the first surface portion such that the outer wheel member simultaneously comes into contact with the first surface portion at a first point and with the second surface portion at a second point and initially remains stationary, the inner wheel member rolls along the inner peripheral surface of the outer wheel member from a first position wherein the portion of the outer peripheral surface of the inner wheel in contact with the inner peripheral surface of the outer wheel lies adjacent to said first point and the inner wheel member is magnetically attracted to the first surface portion to a second position wherein the portion of the outer peripheral surface of the inner wheel in contact with the inner peripheral surface of the outer wheel lies adjacent to said second point and the inner wheel member is magnetically attracted to the second surface portion so as to maintain the outer wheel in contact with said second surface portion so that the vehicle can then travel from said initial stationary position along said second surface portion.

2. A vehicle as defined in claim 1 wherein the permeable portion of the inner wheel member is in the form of a pair of circular members arranged widthwise of the vehicle body, and the magnet is interposed between the circular members with its poles in contact therewith.

3. A vehicle as defined in claim 2 wherein the magnet is provided an annular gear surrounding the periphery of the magnet and disposed at an intermediate portion thereof along a plane perpendicular to the axis of the magnet, the drive assembly has a gear in mesh with the annular gear, and the outer wheel member comprises a pair of circular wheel elements for contact with a running surface for the vehicle to travel along.

4. A vehicle as defined in claim 3 wherein each of the pair of circular wheel elements of the outer wheel member has a cuplike-shape.

5. A vehicle as defined in claim 4 wherein the outer wheel member has a disk formed in its central portion with an opening for the magnet to expand therethrough and covering the opening of each of the cuplike wheel elements, and the disk is flexible so as to shift its opening radially.

6. A vehicle as defined in claim 1 wherein the vehicle body has mounted thereon a computer and a device for detecting the position of the vehicle on the pipe to produce a vehicle orientation signal.

7. A vehicle as defined in claim 6 wherein the vehicle body has mounted therein a surface detector comprising a projector for emitting light forwardly of the vehicle body, a position sensor for detecting the position of a reflecting surface from the light emitted by the projector and reflected from the reflecting surface to produce a surface position signal, and means for scanning about an axis in parallel to the direction of advance of the vehicle body, the computer comprising means for identifying the configuration of the surface ahead of the vehicle from the vehicle position signal and the surface position signal to feed to the drive assembly a signal for controlling the travel of the vehicle in accordance with the identified surface configuration.

8. A vehicle as defined in claim 7 wherein the means for identifying the configuration collects the data of configuration of the surface ahead of the vehicle.

9. A vehicle as defined in claim 6 wherein the computer has stored therein the patterns of surface configurations which can be present within the pipes and selects the corresponding pattern from among the stored pattern with reference to the surface configuration data provided by the surface position signal for use in identifying the surface configuration ahead of the vehicle.

10. A vehicle for use in pipes comprising a vehicle body, at least one wheel provided respectively on the vehicle body, and a drive assembly for driving at least one wheel, the wheel comprising an outer wheel member having an annular peripheral wall, an inner wheel member including a portion of magnetically permeable material having an outside diameter smaller than the inner diameter of the other wheel member and rollable on the inner peripheral surface of the outer wheel member, and a magnet provided in the inner wheel member and having magnetic poles in contact with the permeable portion, the drive assembly being connected to the outer wheel member of said wheel, the magnet having a magnetic force sufficient to hold the vehicle on the surface of a pipe to prevent the vehicle from falling off the pipe so that when the vehicle travels from a first surface portion to a second surface portion at an angle inclined relative to the first surface portion such that the outer wheel member simultaneously comes in contact with the first surface portion at a first point and with the second surface portion at a second point and initially remains stationary, the inner wheel member rolls along the inner peripheral surface of the outer wheel member from a first position wherein the portion of the outer peripheral surface of the inner wheel in contact with the inner peripheral surface of the outer wheel lies adjacent to said first point and the inner wheel member is magnetically attracted to the first surface portion to a second position wherein the portion of the outer peripheral surface of the inner wheel in contact with the inner peripheral surface of the outer wheel lies adjacent to said second point and the inner wheel member is magnetically attracted to the second surface portion so as to maintain the outer wheel in contact with said second surface portion so that the vehicle can then travel from said initial stationary position along said second surface portion.

11. A vehicle as defined in claim 10 wherein the permeable portion of the inner wheel member is in the form of a pair of circular members arranged widthwise of the vehicle body, and the magnet is interposed between the circular members with its poles in contact therewith, the outer wheel member having the annular peripheral wall for the pair of circular members to roll along and side walls closing the respective ends of the peripheral wall and surrounding the inner wheel member.

12. A vehicle as defined in claim 10 wherein the vehicle body has mounted thereon a computer and a device for detecting the position of the vehicle on the pipe to produce a vehicle orientation signal.

13. A vehicle as defined in claim 12 wherein the vehicle body has mounted therein a surface detector comprising a projector for emitting light forwardly of the vehicle body, a position sensor for detecting the position of a reflecting surface from the light emitted by the projector and reflected from the reflecting surface to produce a surface position signal, and means for scanning about an axis in parallel to the direction of advance of the vehicle body, the computer comprising means for identifying the configuration of the surface ahead of the vehicle from the vehicle position signal and the surface position signal to feed to the drive assembly a signal for controlling the travel of the vehicle in accordance with the identified surface configuration.

14. A vehicle as defined in claim 13 wherein the means for identifying the configuration collects the data of configuration of the surface ahead of the vehicle.

15. A vehicle as defined in claim 12 wherein the computer has stored therein the patterns of surface configurations which can be present within the pipes and selects the corresponding pattern from among the stored pattern with reference to the surface configuration data provided by the surface position signal for use in identifying the surface configuration ahead of the vehicle.

* * * * *